(12) United States Patent
Silander

(10) Patent No.: US 10,768,289 B2
(45) Date of Patent: Sep. 8, 2020

(54) PULSED RADAR SYSTEM AND METHOD OF OPERATING A PULSED RADAR SYSTEM

(71) Applicant: SAAB AB, Linköping (SE)

(72) Inventor: Anders Silander, Göteborg (SE)

(73) Assignee: SAAB AB, Linköping (SE)

( * ) Notice: Subject to any disclaimer, the term of this patent is extended or adjusted under 35 U.S.C. 154(b) by 168 days.

(21) Appl. No.: 15/737,615

(22) PCT Filed: Jun. 18, 2015

(86) PCT No.: PCT/SE2015/050717
§ 371 (c)(1),
(2) Date: Dec. 18, 2017

(87) PCT Pub. No.: WO2016/204665
PCT Pub. Date: Dec. 22, 2016

(65) Prior Publication Data
US 2018/0156908 A1  Jun. 7, 2018

(51) Int. Cl.
*G01S 13/30* (2006.01)
*G01S 13/10* (2006.01)
(Continued)

(52) U.S. Cl.
CPC .............. *G01S 13/30* (2013.01); *G01S 7/034* (2013.01); *G01S 13/106* (2013.01); *G01S 13/286* (2013.01); *G01S 7/282* (2013.01)

(58) Field of Classification Search
CPC ........ G01S 13/10; G01S 13/106; G01S 13/24; G01S 13/26; G01S 13/286; G01S 13/30
See application file for complete search history.

(56) References Cited

U.S. PATENT DOCUMENTS 5,309,160 A * 5/1994 Powell .................... G01S 13/70
                                                              342/128
5,442,359 A * 8/1995 Rubin ..................... G01S 13/30
                                                              342/109
(Continued)

FOREIGN PATENT DOCUMENTS

EP         0049087 A1    4/1982
JP         61-68573 A    4/1986
(Continued)

OTHER PUBLICATIONS

European Search Report dated Jan. 21, 2019 in corresponding European Application No. 15895762.1 (7 pages).
(Continued)

*Primary Examiner* — Peter M Bythrow
(74) *Attorney, Agent, or Firm* — Venable LLP; Jeffri A. Kaminski

(57) ABSTRACT

The invention relates to a method for operating a pulsed radar system, wherein the pulsed radar system comprises a transmitting antenna, configured to transmit transmission signals, a receiving antenna, configured to receive reflected signals and a signal generating means, configured to generate transmission signals. The method comprises the steps of generating a first transmission signal at a first centre frequency, generating a second transmission signal at a second centre frequency and transmitting the first and the second transmission signals during a predefined transmission time window. The first transmission signal is significantly longer than the second transmission signal. The transmission of the second transmission signal starts during or at the end of the transmission of the first transmission signal and ends essentially at the end of the transmission time window. When the first and/or second transmission signal hits a target a first reflected signal and/or a second reflected signal is generated, wherein the centre frequency of the first reflected signal
(Continued)

correlate to the centre frequency of the first transmission signal and the centre frequency of the second reflected signal correlate to the centre frequency of the second transmission signal, and wherein the method further comprises the method step of receiving the first and/or second reflected signal.

8 Claims, 4 Drawing Sheets

(51) Int. Cl.
    *G01S 13/28*     (2006.01)
    *G01S 7/03*     (2006.01)
    *G01S 7/282*     (2006.01)

(56) References Cited

U.S. PATENT DOCUMENTS

| | | | | |
|---|---|---|---|---|
| 5,726,657 | A * | 3/1998 | Pergande | G01S 13/24 |
| | | | | 342/131 |
| 5,808,580 | A * | 9/1998 | Andrews, Jr. | G01S 13/582 |
| | | | | 342/108 |
| 6,184,820 | B1 | 2/2001 | Kratzer | |
| 6,225,943 | B1 * | 5/2001 | Curley | G01S 13/227 |
| | | | | 342/137 |
| 7,081,848 | B1 * | 7/2006 | Adams | G01S 7/2923 |
| | | | | 342/118 |
| 2012/0249364 | A1 | 10/2012 | Bon et al. | |
| 2014/0292563 | A1 * | 10/2014 | Palmer | G01S 7/28 |
| | | | | 342/26 R |

FOREIGN PATENT DOCUMENTS

| KR | 20090105752 A | 10/2009 |
|---|---|---|
| WO | 2005019854 A2 | 3/2005 |
| WO | 2005019854 A3 | 3/2005 |

OTHER PUBLICATIONS

Wang J et al., "Analysis of Concatenated Waveforms and Required STC", Radar Conference, 2008. RADAR '08. IEEE, Piscataway, NJ, USA, May 26, 2008, pp. 1-6. (ISBN 978-1-4244-1538-0).
International Search Report of PCT/SE2015/050717, dated Feb. 8, 2016 (5 pages).
Written Opinion of PCT/SE2015/050717, dated Feb. 8, 2016 (7 pages).
International Preliminary Report on Patentability of PCT/SE2015/050717, dated Jun. 13, 2017 (6 pages).
Korean Office Action in corresponding Korean Patent Application No. 10-2018-7001670 dated Jan. 17, 2020 (8 pages).
Nitin Bharadwaj et al; "Wideband Waveform Design Principles for Solid-State Weather Radars"; Journal of Atmospheric and Oceanic Technology; American Meteorological Society; vol. 29; Jan. 2012; pp. 14-31 (18 pages).

\* cited by examiner

PULSED RADAR SYSTEM AND METHOD OF OPERATING A PULSED RADAR SYSTEM

CROSS-REFERENCES TO RELATED APPLICATIONS

This application is a U.S. National Stage application of PCT/SE2015/050717, filed Jun. 18, 2015 and published on Dec. 22, 2016 as WO 2016/204665 all of which are hereby incorporated by reference in their entireties.

TECHNICAL FIELD

The present invention relates to methods for operating a pulsed radar system. The present invention further relates to a pulsed radar system for executing such methods and a program, a computer device readable medium carrying such a program and a control unit enabling that such methods are executed by the pulsed radar system.

BACKGROUND

The concept of radar was discovered late 19th century and was further developed during the first and second world wars where pulsed radars where used in order to detect e.g. hostile aircrafts. A pulsed radar operates at two operation modes, a transmission mode where pulsed, high power radio frequency signals, referred to as transmission signals, are transmitted and a reception mode where the reflected echo of the transmitted transmission signals, which are referred to as reflection signals, reflected signals or reply signals, are received. The carrier frequency of such transmission signal is herein referred to as centre frequency. The transmission signals are transmitted by means of transmission means and the reflected signals are received by means of receiving means.

When a transmission signal is transmitted the transmission signal will give rise to a number of reflected signals originating from all structures, such as e.g. vehicles, humans, and houses, against which the transmitted signal may echo. By means of commonly known methods for filtering out relevant targets from not relevant targets, such as e.g. background scatter and like, the reflected signals resulting from the relevant targets can be analysed. Such commonly known methods may e.g. be based on recognition of certain structures, detecting abnormalities in a known environment or applying various signal filters, but also other methods exists. To give yet one example, prior art comprises various methods for filtering out relevant targets from not relevant targets based on e.g. target characteristics. Such methods will not be addressed more herein but are considered to be part of common general knowledge. When hereinafter referring to targets only targets which are relevant to detect and to analyse are considered. Structures giving rise to background scatter and like are not considered to be targets relevant for detection and further analysis. Targets may e.g. be hostile aircrafts, hostile vehicles or incoming missiles. Generally a number of transmission signals are sent at respective target.

Since only a small portion of a transmitted high power radio frequency signal is reflected when a target is hit the transmission signal has significantly higher power than the reflected reply signal. Thus, for a pulsed radar system designed to detect small targets far away, the receiving means configured to detect the reflected signals have to be able to detect significantly lower powers than what is transmitted by the transmission means. This implies that the receiving means needs to be disconnected in transmission mode since the high powers transmitted by the transmission means otherwise would damage the receiving means. This in turn implies that incident, reflected signals, due to reflected echoes from close range targets, received when the pulsed radar system is set in transmission mode, thus during the time the receiving means are disconnected, are not detected. During the time the receiving means are disconnected the transmission signal travels a certain distance and consequently a close range target located within half the distance the transmission signal travels during this time will not be detected. This is referred to as the minimal measuring range or the blind range of the pulsed radar system, and states the minimum distance from the pulsed radar system a target must be situated at in order to be detected by the pulsed radar system. A typical value of 1 µs for the pulse width of short range radar corresponds to a minimum range of about 150 m, which generally is acceptable.

From the radar equation can be derived that the maximum range of a pulsed radar system is proportional to e.g. the duration of the transmission signal and the maximum output power of the radar, hence the average signal output power of the pulsed radar system during operation. Thus, for the nowadays commonly used pulsed radar systems with solid state transmission the lower maximum output power may be compensated for by prolonging the time period in transmission mode. The longer periods in transmission mode applied for such pulsed radar systems mean more significant blind range and thereby a more significant range within which it is possible to miss a possible target.

Thus, there is a need for further improvements.

SUMMARY

An object of the present invention is to provide a method of operating a pulsed radar system which overcomes, or at least alleviates, the problems known with commonly known pulsed radar systems and how they are operated. The object is achieved by a method according to claim 1. Further advantageous aspects of methods of how to operate such pulsed radar system are disclosed in the dependent claims.

The present invention also relates to a pulsed radar system configured for executing such methods of operating a pulsed radar system. Such pulsed radar system is defined by claim 9 and further advantageous aspects of such pulsed radar system are disclosed by claims 10 and 11. Pulsed radar system is herein also simply referred to as radar system.

Further, the present invention relates to a program comprising program code for performing the steps of any aspect, or a combination of aspects, of operating a pulsed radar system. The present invention also refers to a computer device readable medium carrying a program comprising such program code and to a control unit being configured to perform the steps of any aspect, or a combination of aspects, of operating a pulsed radar system.

A pulsed radar system operates in a transmission mode, during which transmission means enable the pulsed radar system to transmit transmission signals by means of a transmitting antenna, and in a reception mode, during which receiving means of the pulsed radar system enable the pulsed radar system to receive, or listens to, reflections of the transmitted transmission signals. The reflections of the transmission signals, which are generated when a transmitted transmission signal hits a target against which the transmitted transmission signal can be reflected, are referred to as reflected signals. The receiving means may e.g. comprise a receiving antenna, configured to receive reflected signals, signal processing means, configured to process received reflected signals, and other means providing functionalities necessary and/or desirable when receiving or processing reflected signals. The processing of the reflected signals may e.g. comprise amplifying, dividing or applying different signal filters in order to be able to access information from the received reflected signals.

When operating in transmission mode the transmission means are activated and the receiving means are deactivated. Activation and deactivation of the transmission means and receiving means may also be referred to as that the transmission means are connected or disconnected. Obviously, the same applies for the receiving means. Thus, in transmission mode, even if a transmitted transmission signal hits a target, which generates a reflected signal, and that reflected signal reaches the receiving antenna, the receiving means are not able to detect the reflected signal since the receiving means are deactivated or disconnected. This implies that the pulsed radar system is blind during the period of time when transmission signals are being transmitted. Thus, a target located within half the distance a transmitted transmission signal travels during this blind period will not be detected. This is what is referred to as the minimal measuring range or the blind range of the radar system.

According to the present invention, for a pulsed radar system it is possible to form a radar pulse sequence by combining two subpulses. One of these subpulses is used for detection at long range and does hence contain most of the pulse energy, which implies long duration (long transmitting time). The other subpulse is used for detection within the blind range region of the first subpulse, hence a short range region, which implies short duration (short transmitting time). The second subpulse is transmitted at the end of the radar pulse sequence. For radar systems with large bandwidth compared to the bandwidth of the transmitted and received signals it is possible to separate the two subpulses by means of frequency. The separation of the two subpulses at reception mode may e.g. be performed by using two matched signal filters, wherein the two subpulses can be separated by means of their respective centre frequency. Thereby, the method of the present invention overcomes or at least alleviates the problems associated with blind range.

Other means of separating the two subpulses by means of their respective frequency is also possible. Such means are considered to be part of common general knowledge.

The present invention refers to a method for operating a pulsed radar system, wherein the pulsed radar system comprises a transmitting antenna, which is configured to transmit transmission signals and a receiving antenna, which is configured to receive reflected signals. The transmitting antenna is part of transmission means, enabling the transmission of transmission signals, and wherein the receiving antenna is part of receiving means, enabling that reflected signals are received and further processed. The pulsed radar system further comprises a signal generating means, configured to generate transmission signals. According to preferred aspects the pulsed radar system further comprises a signal processing means configured to process received signals.

The signal generating means may be part of the transmission means and the signal processing means may be part of the receiving means. The transmitting antenna and the receiving antenna may be one antenna, which in turn may be an antenna array, which can operate both in transmission mode and in reception mode, preferably by applying a duplexer or like, or may be two separate antennas or antenna arrays.

For clarification purposes hereinafter the following references are applied:

The first transmission signal is indicated by S1, has a centre frequency indicated f1 and is transmitted between S1$t$1 and S1$t$2 in time.

The second transmission signal is indicated by S2, has a centre frequency indicated f2 and is transmitted between S2$t$1 and S2$t$2 in time.

Respective reflected signal is indicated rS1 and rS2.

t0 indicates the start of a transmission time window where the pulsed radar system is set in transmission mode and tmax indicates when the transmission time window ends and a reception time window, during which the pulsed radar system is set in reception mode, takes over.

The method of the present invention comprises the steps of:

generating a first transmission signal, S1, at a first centre frequency, f1, generating a second transmission signal, S2, at a second centre frequency, f2, and transmitting the first and the second transmission signals, S1, S2, during a predefined transmission time window, t0-tmax, wherein the transmission time window, t0-tmax, extends from a time t0 and to a time tmax.

Transmission of the first signal, S1, is performed between t0 and tmax, thus, the transmission starts at t0, whereby t0 may be considered to be a start time, and is ongoing until tmax is reached, whereby tmax may be considered to be an end time, or is performed between t0 and the first predetermined timing S1$t$2, occurring before tmax, wherein S1$t$2 is reached before tmax is reached. Transmission of the second signal S2 is performed during a predefined period of time, S2$t$1-S2$t$2, starting at S2$t$1 and ending at S2$t$2, wherein the predefined period of time, S2$t$1-S2$t$2, starts after the start time t0 and ends at the end time tmax or before the end time tmax is reached.

In accordance with the operation of a pulsed radar system, when the first transmission signal S1 hits a target a first reflected signal rS1 is generated and when the second transmission signal S2 hits a target a second reflected signal rS2 is generated. The centre frequency of the first reflected signal, rS1, correlates to the centre frequency of the first transmitted signal, S1, and the centre frequency of the second reflected signal, rS2, correlates to the centre frequency of the second transmitted signal, S2. Thus, the method of the present invention further comprises the method step of:

receiving the reflected first and/or reflected second signal, rS1, rS2.

The receiving of the reflected first and/or second reflected signals, rS1, rS2, may be performed by the receiving antenna and subsequently the received reflected first and/or second reflected signals, rS1, rS2, may be the signal feed to the processing means of the receiving means. The signal processing means may in turn comprise a first and a second signal filter means matched to respective first and second transmission signals/reflected signals, S1, S2/rS1, rS2, such that the received signals may be separated by applying said first and/or second signal filter means to the received first and/or second reflected signals.

According an aspect of the present invention the first centre frequency, f1, of the first transmission signal, differs from the second centre frequency, f2, of the second transmission signal. In order to be able to separate respective reflected signal, rS1, rS2, it is desirable that the reflected signals rS1, rS2 can be separated at reception. Having different frequencies is a suitable approach in order to be able to provide such separation. The difference, or frequency separation, between the centre frequencies, f1, f2, of the first transmission/reflection signal S1/rS1 and the second transmission/reflection signal S2/rS2 has to be sufficiently large such that separation by applying signal filter means is possible. Also, the centre frequencies, f1, f2, have to be accommodated within the instantaneous bandwidth of the radar system. This also has the advantage that the frequency intermodulation products will be located further away from S1 and S2 in terms of frequency.

Thus, according to one aspect of the present invention the method further comprises the method step of:
separating the first and second reflected signals, rS1, rS2, by means of their respective first and second centre frequency, f1, f2.

Since the first and second transmission signals, S1, S2, have different carrier frequencies, or, are transmitted with different centre frequencies, f1, f2, wherein also the reflected signals, rS1, rS2, are correlated to respective centre frequency, f1, f2, the first and second reflected signals, rS1, rS2, can easily be separated from each other by means of signal filter means matched to respective centre frequency, f1, f2.

Thus, according to yet an aspect of the present invention the method of operating a pulsed radar system, wherein signal processing means of the receiving means comprises a first and a second signal filter means, wherein a first signal filter means is matched to the first centre frequency and a second signal filter means is matched to the second centre frequency, the first and second signal filter means are used at reception mode to separate the first reflected signal, rS1, from the second reflected signal, rS2, by means of respective centre frequency, f1, f2. Applying signal filter means is a preferred way to achieve such signal separation.

According to one aspect of the present invention the second centre frequency, f2, is higher than the first centre frequency, f1. According to another aspect the second centre frequency, f2, is lower than the first centre frequency, f1. Which frequency that is the higher and which frequency that is the lower may e.g. be determined by the hardware the current hardware configuration.

According to the present invention the first transmission signal, S1, should be relatively long in relation to the second transmission signal, S2. According to one aspect of the present invention the duration of the second transmission signal, S2, may e.g. be 1/BW (the bandwidth of the present signal).

The length of the first and second transmission signals, S1, S2, are decisive for the functionality of the radar system of the present invention and are the most important parameters to consider when configuring the radar system according to prevailing conditions and in order to obtain desired outcome. It is desirable that as low amount as possible of the total amount of energy available for transmission is reserved for the second transmission signal, S2. Preferably, the first transmission signal, S1, which is the longer of the first and second transmission signals, S1, S2, is modelled to be within a certain bandwidth, BW. In reception mode pulse compression is used in order to obtain desired resolution which will be in the order of 1/BW. Concerning the second transmission signal, S2, thus the shorter of the first and second transmission signals, S1, S2, it is desirable that the second transmission signal is as short as possible but still it is desirable that the first and the second transmission signals, S1, S2, have the same resolution. This will facilitate the creation of the radar image formed when the echoes of the first and second transmission signals, S1, S2, thus the first and second reflected signals, rS1, rS2, are combined.

Thus, according to one aspect of the present invention the bandwidth of the first transmission signal, S1, and the bandwidth of the second transmission signal, S2, are essentially equal.

Henceforth three different transmission modes, disclosing different alternatives of how the transmission of the first transmission signal and the second transmission signal, may be implemented will be disclosed.

According to a first aspect the transmission of the first transmission signal, S1, and the transmission of the second transmission signal, S2, ends at the same time.

According to a second aspect the transmission periods, S1t1-S1t2 of the first transmission signal, S1, and S2t1-S2t2 of the second transmission signal, S2, overlap for at least a period of time.

According to a third aspect transmission of the second transmission signal, S2, starts at essentially the same time, S2t1, as transmission of the first transmission signal, S1, ends, S1t2. What herein is considered to be within the scope of the present invention by stating that transmission of the second transmission signal, S2, starts essentially at the same time as the transmission of the first transmission signal, S1, ends is that the start of transmission of the second transmission signal, S2, coincides with, or is directly subsequent to, the timing when the transmission of the first transmission signal, S1, is terminated.

It is also considered to be within the scope of the present invention that there is a small delay or offset in time between the termination of the transmission of the first transmission signal, S1, and the start of transmission of the second transmission signal, S2.

These three transmission modes will be further discussed in the following detailed description.

The present invention further relates to a pulsed radar system, configured for transmitting and receiving pulsed radar signals, being able to execute any aspect, or a combination of aspects, of the method of the present invention. Such pulsed radar system may comprise:
a transmitting antenna, configured to transmit transmission signals,
a receiving antenna, configured to receive reflected signals, and
a signal generating means, configured to generate transmission signals.

According to an aspect of the present invention the pulsed radar system further comprises at least one signal processing means, wherein the at least one signal processing means is configured to process received reflected signals, rS1, rS2. Depending on the nature of the received reflected signal, and the purpose of the pulsed radar system, thus what information from the reflected signals that is desirable to access, the processing of the reflected signals may comprise a number of operations such as e.g. amplifying, dividing or applying different signal filters. Thus, the signal processing means may comprise a number of components providing a number of functionalities. Processing of received reflected signals is not part of the invention per se and is not further discussed herein.

A radar system according to the present invention is suitable for radar applications wherein radar is used for detecting a target, and possibly estimating the kinematic characteristics of such target, but a radar system according to the present invention may also be applied for imaging radar applications.

According to yet an aspect of the present invention the transmitting antenna and the receiving antenna is the same antenna. For aspects of the present invention where the transmitting antenna and the receiving antenna is the same antenna the pulsed radar system comprises a duplexer or other component which provides essentially the same functionality as a duplexer. The duplexer is arranged between the antenna and the signal generating means and between the antenna and the signal processing means, and is configured to be switchable between a transmission mode and a reception mode. When the duplexer is set in transmission mode the duplexer is configured to direct a transmission signal generated by the signal generating means to the antenna, such that transmission of the generated transmission signal, by the antenna, is enabled. When the duplexer is set in reception mode the duplexer is configured to direct a reflected signal, received by the antenna, from the antenna and to the signal processing means for further processing.

In comparison to other aspects of the present invention, wherein the transmitting antenna and the receiving antenna are at least two separate antennas, having a single antenna and using a duplexer, or any other component with corresponding functionality to switch the operation mode of the antenna between a transmission mode and a reception mode, has the advantage that only one antenna is needed which e.g. makes the antenna arrangement less bulky.

The present invention further refers to a program for a computer device comprising program code for performing method steps according to any aspect, or a combination of aspects, of the present invention, when the program is run on a computer device. The present invention also refers to a computer device readable medium carrying such a computer program comprising program code. Further, the present invention refers to a control unit for controlling execution of the method steps according to any aspect, of a combination of aspects, of the present invention.

It should be noted that when herein referring to antenna this is considered to include antennas with just one antenna element as well as array antennas, comprising a number of interacting antenna elements, also referred to antenna array.

Further advantages and advantageous features of the invention are disclosed in the following description and in the dependent claims.

BRIEF DESCRIPTION OF THE DRAWINGS

With reference to the appended drawings, below follows a more detailed description of exemplifying embodiments of the present invention.

DETAILED DESCRIPTION OF EXAMPLE EMBODIMENTS OF THE INVENTION

Figure 1A:
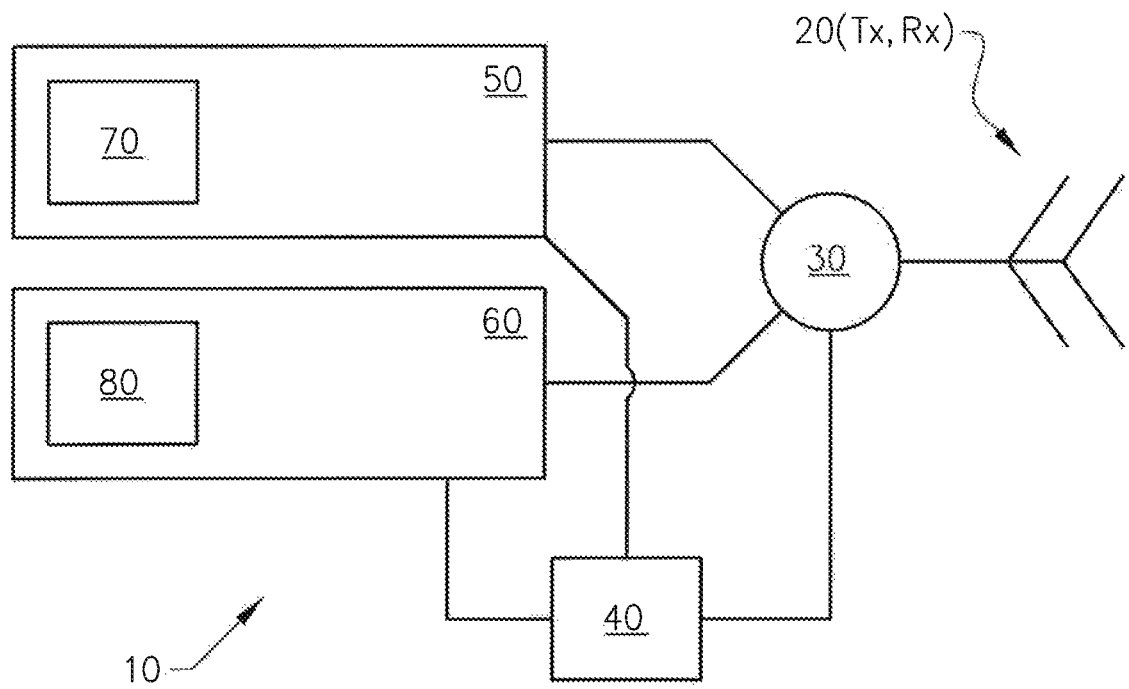
FIG. 1a-b shows two schematic views of simplified embodiments of radar systems according to an exemplary embodiment of the present invention.

FIG. 1a shows an exemplary embodiment of a radar system 10 according to the present invention. The radar system 10 comprises an antenna 20, a duplexer 30, a control unit 40, a transmission means 50, wherein the transmission means 50 in turn comprises a signal generating means 70, and a receiving means 60, wherein the receiving means 60 in turn comprises a signal processing means 80. The antenna 20 of the embodiment disclosed in FIG. 1a operates as a transmitting antenna Tx when the radar system 10 is in transmission mode and as a receiving antenna Rx when the radar system 10 is in reception mode. A duplexer 30, controlling how signals are directed between the transmission means 50, the receiving means 60 and the antenna 20, is provided between the transmission means 50, the receiving means 60 and the antenna 20. The operations of the duplexer 30, the transmission means 50 and the receiving means 60 are controlled by the control unit 40.

As is apparent for a person skilled in the art also other components, providing essentially the same functionality in regards of signal redirecting characteristics, may be used instead of a duplexer 30 such as a switch or like.

The operation of the radar system 10 can in very simple terms be described by; when the radar system 10 is in transmission mode;
a transmission signal is generated by the signal generating means 70 of the transmission means 50 and is subsequently directed to the antenna 20 (in this case referred to as a transmitting antenna, Tx) by the duplexer 30 such that a first and a second transmission signal S1, S2 can be transmitted, and
when the radar system 10 is in reception mode;
the antenna 20 (in this case referred to as a receiving antenna, Rx) receives a first and/or second reflected signal rS1, rS2, wherein the received signal/signals rS1, rS2 is directed by the duplexer 30 from the receiving antenna Rx to the receiving means 60 comprising the signal processing means 80 where the received signal/signals rS1, rS2 are processed. Preferably a first filter means and a second filter means of the signal processing means 80 is used to separate the received first and second reflected signals rS1, rS2.

In the embodiment shown in FIG. 1a the antenna 20 is schematically depicted as a single antenna element, providing the functionality of a transmitting antenna Tx in transmission mode and of a receiving antenna Rx in receiving mode, but as is apparent to a person skilled in the art the antenna 20 may also be in form of more than one interconnected antenna elements forming an array of antenna elements. Also, in the embodiment disclosed in FIG. 1a a single antenna element 20 is used both for providing the functionality of transmitting antenna Tx and of the receiving antenna Rx, wherein a duplexer 30 or like is connected to the antenna element 20 in order to direct outgoing and incident signals, but as is apparent for a person skilled in the art it is also possible to use one antenna, comprising at least one antenna element, for transmission Tx and one antenna, comprising at least one antenna element, for reception Rx. Such a radar system 11 is schematically disclosed in the embodiment of a radar system 11 shown in FIG. 1b.

Figure 1B:
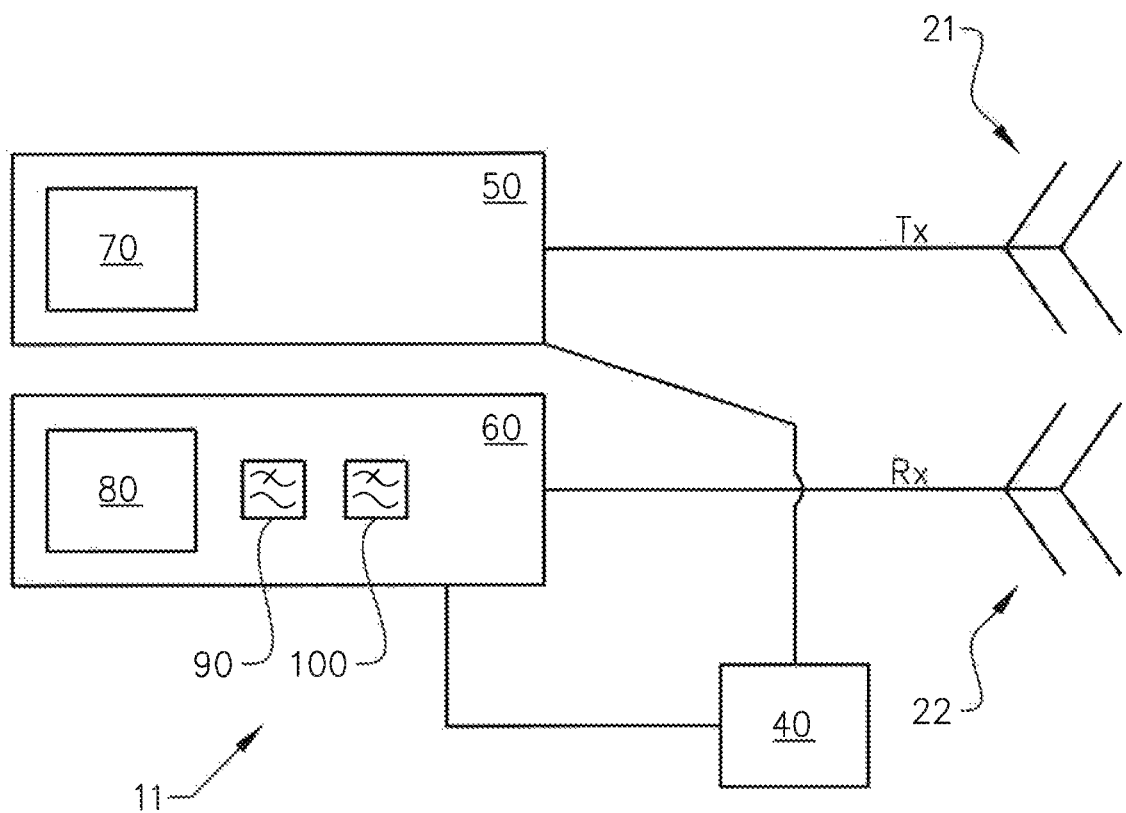

The embodiment of a radar system 11 according to the present invention shown in FIG. 1b, and the components 40, 50, 60, 70, 80 the radar system 11 comprises, are configured according to what previously has been disclosed in relation to the embodiment of the radar system 10 of FIG. 1a. The radar system 11 of FIG. 1b comprises a separate transmitting antenna 21 (Tx) and a separate receiving antenna 22 (Rx) instead of comprising just one antenna 20, which in combination with amongst others the duplexer 30, may work either as a transmitting antenna (Tx) or a receiving antenna (Rx).

Additionally the embodiment of the radar system 11 schematically disclosed that the receiving means 60 of FIG. 1b comprises a first filter means 90 and a second filter means 100, wherein the first filter means 90 is matched to the first reflected signal rS1 and the second filter means 100 is matched to the second reflected signal rS2, such that the received signals may be separated into the first and second reflected signal rS1, rS2 by applying said first and second signal filters means 90, 100.

Even if circuits, wires, cables etc. connecting the components disclosed in FIGS. 1a and 1b are depicted it is considered to be obvious for a person skilled in the art the components of e.g. the transmission means 50 and of the receiving means 60 may be connected to each other in various ways in order to be able to provide respective intended functionality.

It should be emphasized that the radar systems 10, 11 of FIGS. 1a and 1b are extremely schematically shown and that additional components such as e.g. different filters, amplifiers etc. also may be present in a realization of the radar system.

Figure 2A:
FIG. 2a shows a block diagram disclosing the method steps of an exemplary embodiment of the present invention.

FIG. 2a shows a block diagram disclosing the method steps of one exemplary embodiment of the present invention when applied for a radar system 10, 11 as disclosed in FIG. 1a or 1b. The exemplary embodiment of the method is initiated by signal generation operation GEN, wherein signal generating means 70 of the transmission means 50 generates a first and a second transmission signal S1, S2, wherein the first transmission signal S1 has a first centre frequency f1 and the second transmission signal S2 has a second centre frequency f2. The generated transmission signals S1, S2 are subsequently fed by interconnecting connections, such as e.g. cables or circuits, in accordance with general knowledge to the transmitting antenna 20, 21 (Tx) wherein a signal transmission operation TRANS is executed. The transmission of the first and the second transmission signals S1, S2 is performed during a predefined transmission time window, t0-tmax. The transmission operation TRANS, and preferably also the signal generation operation GEN, are performed when the radar system 10, 11 are set in transmission mode. In transmission mode the receiving means 60 are disconnected (or deactivated) whereas the transmission means 50 are connected (or activated). When set in transmission mode and performing transmission operation TRANS the radar system 10, 11 is configured for transmitting transmission signals.

When the first and second transmission signals S1, S2 have been transmitted the radar system 10, 11 is set in reception mode wherein the receiving means 60 are connected (or activated) and the transmission means 50 are disconnected (or deactivated). This is referred to as reception operation REC. When set in reception mode and performing reception operation REC the radar system 10, 11 is configured for receiving reflected signals or reply signals rS1, rS2 resulting from that the first and/or second transmission signal S1, S2 is reflected against a target. The reflected signals rS1, rS2 are received by receiving antenna 20, 22 (Rx).

Thus, the exemplary embodiment of a method for operating a pulsed radar system 10, 11 disclosed in FIG. 2a comprises the method steps of:
generating a first transmission signal S1 at a first centre frequency f1,
generating a second transmission signal S2 at a second centre frequency f2, and
transmitting the first and the second signal S1, S2 during the predefined transmission time window t0-tmax.

The transmission time window t0-tmax extends from a start time t0 to an end time tmax. Different possible timings of respective first and second transmission signals S1, S2 are disclosed in relation to FIGS. 3a to 3c.

The method further comprises the method step of:
receiving the first and/or second reflected signal rS1, rS2.

Figure 2B:
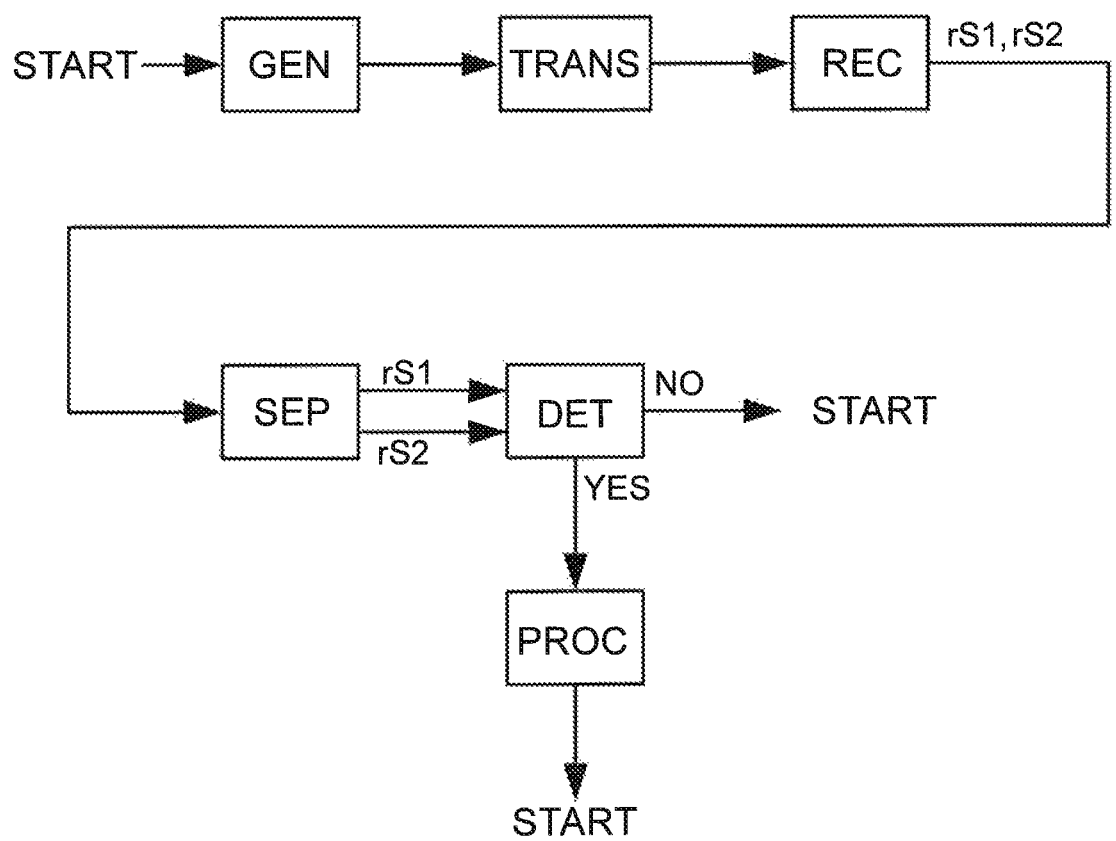
FIG. 2b shows a block diagram disclosing the method steps of another exemplary embodiment of the present invention.

FIG. 2b shows a block diagram disclosing the method steps of another exemplary embodiment of the present invention when applied for a radar system 10, 11 as disclosed in FIG. 1a or 1b. As for the exemplary embodiment of the method disclosed in FIG. 2a is the exemplary embodiment of the method disclosed in FIG. 2b initiated by signal generation operation GEN, wherein signal generating means 70 of the transmission means 50 generates a first and a second transmission signal S1, S2, wherein the first transmission signal S1 has a first centre frequency f1 and the second transmission signal S2 has a second centre frequency f2. The generated transmission signals S1, S2 are subsequently fed by interconnecting connections, such as e.g. cables or circuits, in accordance with general knowledge to the transmitting antenna 20, 21 (Tx) wherein a signal transmission operation TRANS is executed. The transmission of the first and the second transmission signals S1, S2 is performed during a predefined transmission time window, t0-tmax. The transmission operation TRANS, and preferably also the signal generation operation GEN, are performed when the radar system 10, 11 are set in transmission mode. In transmission mode the receiving means 60 are disconnected (or deactivated) whereas the transmission means 50 are connected (or activated). When set in transmission mode and performing transmission operation TRANS the radar system 10, 11 is configured for transmitting transmission signals.

When the first and second transmission signals S1, S2 have been transmitted the radar system 10, 11 is set in reception mode wherein the receiving means 60 are connected (or activated) and the transmission means 50 are disconnected (or deactivated). This is referred to as reception operation REC. When set in reception mode and performing reception operation REC the radar system 10, 11 is configured for receiving reflected signals or reply signals rS1, rS2 resulting from that the first and/or second transmission signal S1, S2 is reflected against a target. The reflected signals rS1, rS2 are received by receiving antenna 20, 22 (Rx).

The reflected signals rS1, rS2 are subsequently separated by means of their respective first and second centre frequency f1, f2 in a signal separation operation SEP. Subsequently of the signal separation operation SEP a determination operation DET is performed wherein it is determined, by means of at least one of the many suitable, commonly known method of analysing radar reflection signals, if either the first and/or second reflected signal rS1, rS2 comprises data related to a target (and not only data referring to background scatter, known objects or like). If it is determined that neither the first reflected signal rS1 nor the second reflected signal rS2 comprise any data referring to a possibly relevant target the method is repeated.

If it is determined that the first and/or second reflected signal rS1, rS2 is considered to comprise data from a possibly relevant target that data is subsequently processed in a signal processing operation PROC. During the signal processing operation PROC the received reflected signals rS1, rS2 are processed with the purpose to detect the presence of a target and estimate the kinetic data of the target. The method is subsequently repeated.

Please note the first and/or second reflected signal rS1, rS2 may be determined to comprise data from more than one possibly relevant target (in addition to data related to not relevant targets, such as data related to background scatter and like). In order to separate relevant targets may e.g.

methods using pulse compression or Doppler filter banks be used according to prior art and common knowledge within the field of technology.

It should be noted that the signal phase aspect should be considered when determining the length of respective interconnecting connections. This is considered to be general knowledge for a person skilled in the art.

The different steps of the exemplary embodiment of the method may be performed sequentially as described or at least to a certain part simultaneously. It should be noted that it is considered to be within the scope of the present invention that the signal separation operation SEP, the operation of separating the first reflected signal rS1 from the second reflected signal rS2, by means of respective first and second centre frequency f1, f2, also may be performed subsequently of the determination operation DET. If so the signal separation operation SEP is executed before the signal processing operation PROC. Further, the method may be executed continuously, meaning that the radar system 10, 11 continuously is either transmitting or receiving, at a predefined time interval or according to a predefined time schedule. The method is preferably repeated continuously, even more preferably at a repetition rate of 1-20 kHz.

Herein processing received first and/or second reflected signal is considered to comprise the broad selection of possible operations that a received reflected signal may be exposed to in order to extract available information from the signal. Possible processing operations are considered to be known to a person skilled in the art and are not further discussed herein.

Figure 3A:
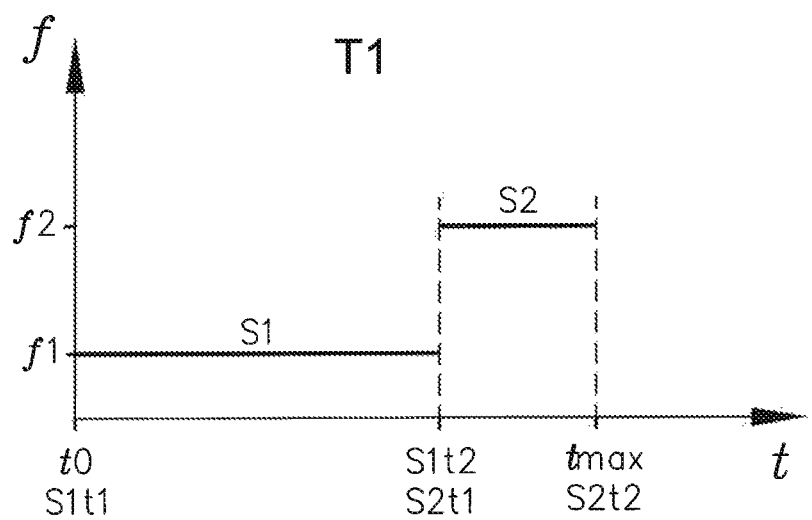
FIG. 3a-c shows a first, a second and a third example of transmission executions according to exemplary embodiments of the present invention.
Figure 3B:
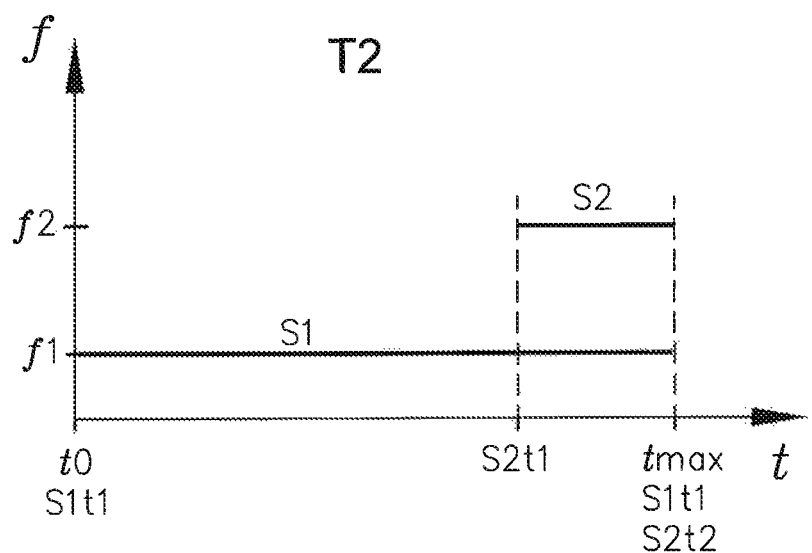
Figure 3C:
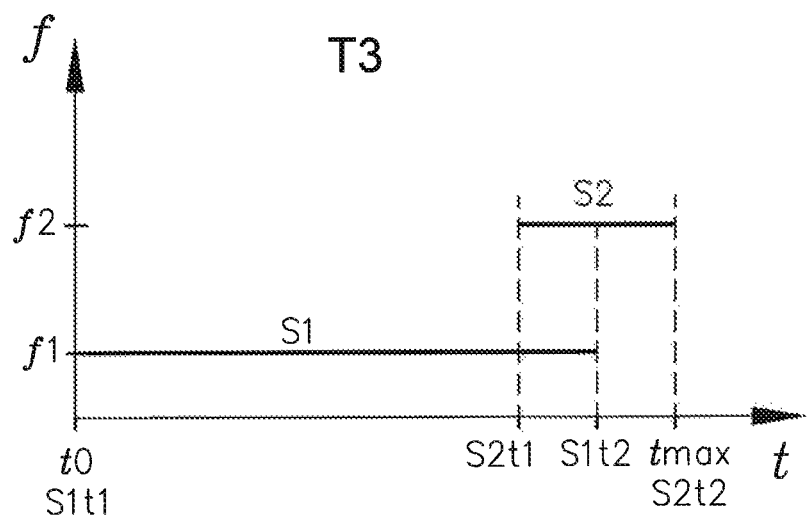

FIG. 3a-c shows a first T1, a second T2 and a third T3 example of transmission executions T1, T2, T3 according to exemplary embodiments of the present invention. The transmission executions T1, T2, T3 are displayed in a frequency-time diagram showing a centre frequency (f) of respective transmission signal S1, S2 on the y axis and the time (t) at which transmission of respective transmission signal S1, S2 is initiated and terminated on the x axis.

In FIG. 3a the exemplary first transmission execution T1 is displayed. According to the exemplary embodiment in FIG. 3a the transmission TxS1 of the first transmission signal S1 is initiated at S1t1 which also is the start of the transmission time window t0. The transmission TxS1 of the first transmission signal S1 is ongoing until S1t2 when the transmission TxS1 is terminated. At the same time as the transmission TxS1 of the first transmission signal S1 is terminated the initiation of transmission TxS2 of the second transmission signal S2 is initiated, i.e. S2t1. Thus, S1t2 and S2t1 coincide. The timing termination of the transmission TxS2 of the second transmission signal S2, S2t2, is terminated at the end of the transmission time window tmax. Thus, both sub signals, transmission signal S1 and transmission signal S2, are transmitted within the transmission time window t0-tmax.

In FIG. 3b the exemplary second transmission execution T2 is displayed. According to the exemplary embodiment in FIG. 3b the transmission TxS1 of the first transmission signal S1 is initiated at S1t1 which also is the start of the transmission time window t0. The transmission TxS1 of the first transmission signal S1 is ongoing until S1t2 which according to the exemplary embodiment of FIG. 3b coincide with the end of the transmission time window tmax, thus S1t2=tmax. The transmission TxS2 of the second transmission signal S2 is initiated at S2t1 and is also ongoing until tmax.

An exemplary advantage with the preferred exemplary first transmission execution T1 displayed in FIG. 3a is that there will be no intermodulation between the two signals S1, S2 at transmission whereby pulse compression may be used.

Referring now to FIG. 3c, wherein the third exemplary embodiment of the third transmission execution T3 is disclosed. Also according to the exemplary embodiment in FIG. 3c the transmission TxS1 of the first transmission signal S1 is initiated at S1t1 which also is the start of the transmission time window t0. The transmission TxS1 of the first transmission signal S1 is terminated at S1t2. The transmission TxS2 of the second transmission signal S2 is initiated at S2t1 which is before S1t2. Thus, the transmission TxS2 of the second transmission signal S2 and the transmission TxS1 of the first transmission signal S1 overlap for a period of time but not during the whole transmission time S2t1-S2t2 of the second transmission signal S2 as of the transmission execution T2 displayed in FIG. 3b. The transmission TxS2 of the second transmission signal S2 is terminated at S2t2 which coincide with the end of the transmission window tmax.

The embodiments of the radar systems 10 of FIG. 1a and FIG. 1b are disclosed in very schematic and simplified manners and should not be seen as limiting of the present invention. Also, please note that the duration of the transmission TxS1 of the first transmission signal S1, S1t1-S1t2, and the duration of the transmission TxS2 of the second transmission signal S2, S2t1-S2t2, as depicted in FIG. 3a-c is highly exaggerated for clarification purposes and should not be seen as limiting.

It is to be understood that the present invention is not limited to the embodiments described above and illustrated in the drawings; rather, the skilled person will recognize that many changes and modifications may be made within the scope of the appended claims.

The invention claimed is:

1. A method for operating a pulsed radar system, wherein the pulsed radar system comprises:
   a transmitting antenna, configured to transmit transmission signals,
   a receiving antenna, configured to receive reflected signals,
   a signal generating means, configured to generate transmission signals, and
   wherein the method comprises the steps of:
   generating a first transmission signal at a first centre frequency,
   generating a second transmission signal at a second centre frequency, wherein the first centre frequency differs from the second centre frequency, and
   transmitting the first and the second signal during a predefined transmission time window,
   wherein the transmission time window extends from a start time t0 to an end time tmax, and
   wherein transmission of the first transmission signal is performed between the start time t0 and the end time tmax, and
   wherein transmission of the second transmission signal is performed during a first predefined period of time starting after the start time t0 and ending at the end time tmax,
   whereby the transmission of the first transmission signal and the transmission of the second transmission signal ends at the same time,
   wherein when the first transmission signal hits a target a first reflected signal is generated and when the second transmission signal hits a target a second reflected signal is generated,
   wherein the centre frequency of the first reflected signal correlate to the centre frequency of the first transmission signal and the centre frequency of the second reflected signal correlate to the centre frequency of the second transmission signal, and wherein the method further comprises the method steps of:
receiving the first and/or second reflected signal, and
separating the first and second reflected signals by means of their respective first and second centre frequency.

2. A method of operating a pulsed radar system according to claim 1, wherein the pulsed radar system additionally comprises a first and a second signal filter means, wherein a first signal filter means is matched to the first centre frequency and a second signal filter means is matched to the second centre frequency, wherein the first and second signal filter means are used to separate the first reflected signal from the second reflected signal by means of respective centre frequency.

3. A method for operating a pulsed radar system according to claim 1, wherein the second centre frequency is higher than the first centre frequency.

4. A pulsed radar system configured for transmitting and receiving pulsed radar signals comprising:
a transmitting antenna, configured to transmit transmission signals,
a receiving antenna, configured to receive reflected signals, and
a signal generating means, configured to generate transmission signals,
the pulsed radar system is operated by a method according to claim 1.

5. A pulsed radar system for transmitting and receiving pulsed radar signals according to claim 4, and wherein the pulsed radar system further comprises at least one:
signal processing means,
wherein the at least one signal processing means is configured to process received reflected signals.

6. A pulsed radar system for transmitting and receiving pulsed radar signals according to claim 4, wherein the transmitting antenna and the receiving antenna is the same antenna, and wherein the pulsed radar system yet further comprises:
a duplexer,
wherein the duplexer is arranged between the antenna and the signal generating means and between the antenna and the signal processing means, and wherein the duplexer is configured to be switchable between a transmission mode and a reception mode, and wherein the duplexer, when set in transmission mode:
is configured to direct a transmission signal generated at the signal generating means to the antenna, for transmission by the antenna, and
when set in reception mode:
is configured to direct a reflected signal, received by the antenna, from the antenna to the signal processing means.

7. A non-transitory computer device readable medium carrying a program comprising program code for performing the method steps of claim 1 when the program is run on a computer device.

8. A control unit for controlling a method for operating a pulsed radar system, the control unit being configured to perform the method steps of the method according to claim 1.

* * * * *